(12) United States Patent
Li et al.

(10) Patent No.: US 12,265,806 B2
(45) Date of Patent: Apr. 1, 2025

(54) DYNAMIC PARTITION CUSTOMIZATION METHOD AND APPARATUS, AND DEVICE

(71) Applicant: JRD COMMUNICATION (SHENZHEN) LTD., Guangdong (CN)

(72) Inventors: Zhijiao Li, Guangdong (CN); Chaofei Wu, Guangdong (CN); Jinming Xiang, Guangdong (CN)

(73) Assignee: JRD COMMUNICATION (SHENZHEN) LTD., Guangdong (CN)

(*) Notice: Subject to any disclaimer, the term of this patent is extended or adjusted under 35 U.S.C. 154(b) by 151 days.

(21) Appl. No.: 18/320,190

(22) Filed: May 18, 2023

(65) Prior Publication Data

US 2023/0289156 A1 Sep. 14, 2023

Related U.S. Application Data

(63) Continuation-in-part of application No. PCT/CN2020/136015, filed on Dec. 14, 2020.

(30) Foreign Application Priority Data

Nov. 23, 2020 (CN) .......................... 202011321286.5

(51) Int. Cl.
*G06F 8/41* (2018.01)
*G06F 8/71* (2018.01)

(52) U.S. Cl.
CPC ................ *G06F 8/451* (2013.01); *G06F 8/71* (2013.01)

(58) Field of Classification Search
None
See application file for complete search history.

(56) References Cited

U.S. PATENT DOCUMENTS 8,146,076 B1 3/2012 Shumway et al.
11,797,288 B2 * 10/2023 Ren ..................... G06F 16/188
(Continued)

FOREIGN PATENT DOCUMENTS

CN 106775650 A 5/2017
CN 106775723 A 5/2017
(Continued)

OTHER PUBLICATIONS

International Search Report in International application No. PCT/CN2020/136015, mailed on Aug. 20, 2021.
(Continued)

*Primary Examiner* — Marina Lee
(74) *Attorney, Agent, or Firm* — PV IP PC; Wei Te Chung

(57) ABSTRACT

The present application provides a dynamic partition customization method and apparatus, and a device. The method includes: generating a plurality of original equipment manufacturer (OEM) image files corresponding to requirements of a plurality of different users at compile time; generating a scatter loading file recording OEM image sub-file segments according to a super image file in a super partition; according to change of a requirement of a user among the plurality of different users, downloading an OEM image sub-file segment corresponding to the changed requirement; and generating a super partition customization file according to the scatter loading file and the OEM image sub-file segment corresponding to the changed requirement.

20 Claims, 3 Drawing Sheets

(56) References Cited

U.S. PATENT DOCUMENTS

| | | | |
|---|---|---|---|
| 12,131,144 B2* | 10/2024 | Wang | G06F 9/4406 |
| 2003/0018870 A1* | 1/2003 | Abboud | G06F 3/0601 |
| | | | 711/173 |
| 2015/0277934 A1* | 10/2015 | Zhang | G06F 9/5077 |
| | | | 713/2 |

FOREIGN PATENT DOCUMENTS

| | | |
|---|---|---|
| CN | 110109695 A | 8/2019 |
| CN | 111694589 A | 9/2020 |

OTHER PUBLICATIONS

Written Opinion of the International Search Authority in International application No. PCT/CN2020/136015, mailed on Aug. 20, 2021.

* cited by examiner

DYNAMIC PARTITION CUSTOMIZATION METHOD AND APPARATUS, AND DEVICE

CROSS-REFERENCE TO RELATED APPLICATION

This application is a continuation of International Application No. PCT/CN2020/136015, filed on Dec. 14, 2020, which claims priority to and the benefit of Chinese Patent Application No. 202011321286.5, filed on Nov. 23, 2020. The disclosures of the aforementioned applications are incorporated herein by reference in their entireties.

TECHNICAL FIELD

The present application relates to the field of embedded technologies, and more particularly, to a dynamic partition customization method and apparatus, and a device.

BACKGROUND

Dynamic partition has been used since a version Q of an Android system, which refers to a user space partition system that can create, destroy, or resize partitions through Over The Air (OTA) updates. The system allocates a dynamic partition to a device, where sub-partitions can be dynamically resized. Although the conventional dynamic partition customization method can make full use of an embedded memory standard specification established by an Embedded Multi-Media Card (EMMC) association mainly for a product such as a mobile phone or a tablet computer to customize an entire dynamic partition. However, since the size of the dynamic partition is larger (possibly up to 6G or more), customizing the entire dynamic partition may result in excessive server resource occupancy when different clients need to be adapted.

SUMMARY

The present application provides a dynamic partition customization method and apparatus, and a device to accelerate development and version compilation and to reduce occupation of server resources.

In an aspect, an embodiment of the present application provides a dynamic partition customization method, including: generating a plurality of original equipment manufacturer (OEM) image files corresponding to requirements of a plurality of different users at compile time; generating a scatter loading file recording OEM image sub-file segments according to a super image file in a super partition; according to change of a requirement of a user among the plurality of different users, downloading an OEM image sub-file segment corresponding to the changed requirement; and generating a super partition customization file according to the scatter loading file and the OEM image sub-file segment corresponding to the changed requirement.

In another aspect, an embodiment of the present application provides a dynamic partition customization apparatus, including: a first generation circuit for generating a plurality of original equipment manufacturer (OEM) image files corresponding to requirements of a plurality of different users at compile time; a second generation circuit for generating a scatter loading file recording OEM image sub-file segments according to a super image file in a super partition; a downloading circuit for, according to change of a requirement of a user among the plurality of different users, downloading an OEM image sub-file segment corresponding to the changed requirement; and a third generation circuit for generating a super partition customization file according to the scatter loading file and the OEM image sub-file segment corresponding to the changed requirement.

In a third aspect, an embodiment of the present application provides a device, including: a memory, a processor, and a computer program stored on the memory and operable on the processor, where the computer program, when executed by the processor, implements steps of the method of the technical solution described above.

According to the technical solution provided in the present application, since the plurality of OEM image files corresponding to the requirements of the plurality of different users are generated at compile time, when the requirement of certain user among the plurality of different users is changed and the OEM image files are downloaded, only the OEM image sub-file segment corresponding to the requirement of the user needs to be downloaded without downloading of the OEM image sub-file segments corresponding to the requirements of other users. Therefore, independent compilation of the OEM images in the super partition is realized, thereby accelerating development and version compilation, and reducing the occupation of server resources.

BRIEF DESCRIPTION OF THE DRAWINGS

In order to more clearly illustrate the technical solutions in embodiments of the present application, the accompanying drawings depicted in the description of the embodiments will be briefly described below. It will be apparent that the accompanying drawings in the following description are merely some embodiments of the present application, and other drawings may be obtained from these drawings without creative effort by those skilled in the art.

DETAILED DESCRIPTION

Figures 1, 2:
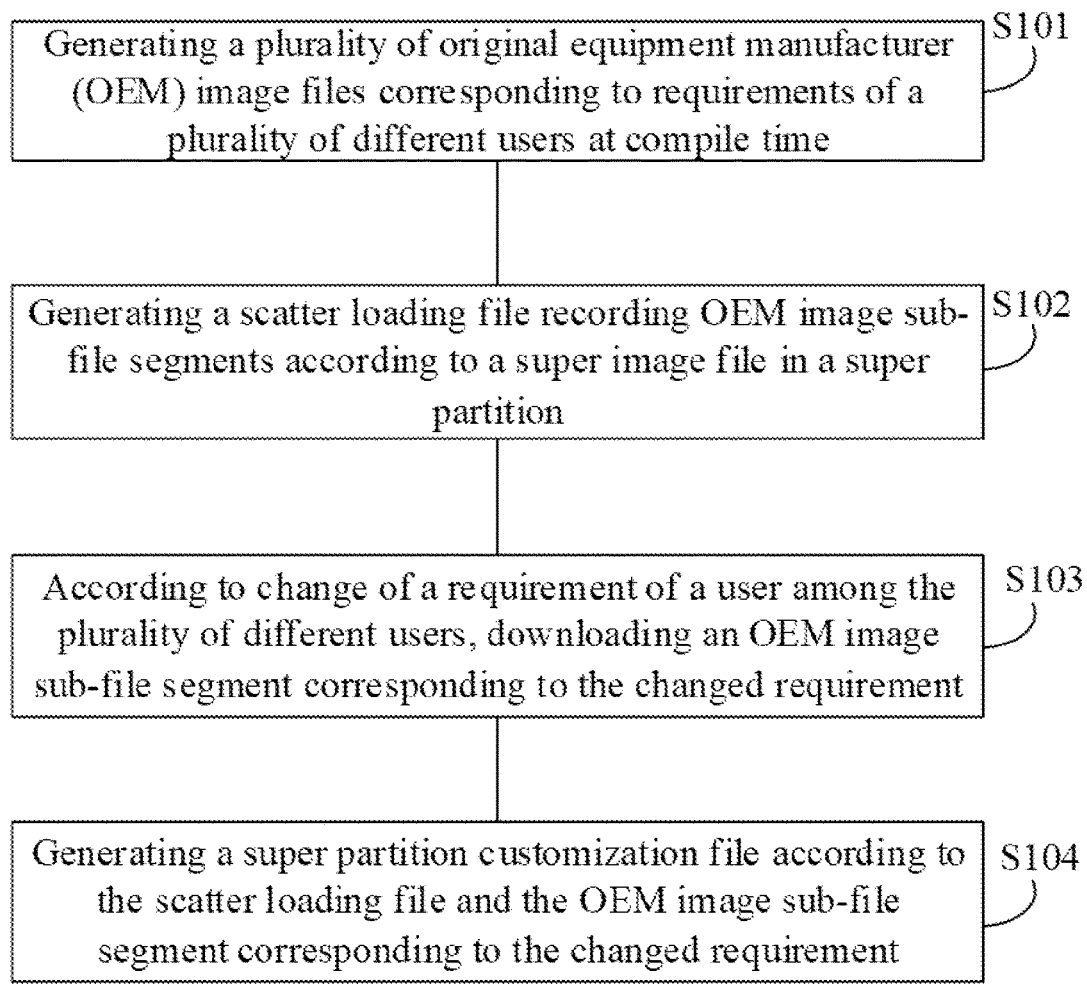
FIG. 1 is a flowchart of a dynamic partition customization method according to an embodiment of the present application.
FIG. 2 is a storage diagram of n sub-image files and k OEM image files in a server according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present disclosure, all other embodiments obtained by those skilled in the art without creative work fall within the protection scope of the present disclosure.

In the present specification, adjectives such as the first and second may only be used to distinguish one element or action from another element or action without necessarily requiring or implying any actual such relationship or order. Where circumstances permit, reference to elements or components or steps (etc.) should not be construed as limited to only one of the elements, components, or steps, but may be one or more of the elements, components, or steps, etc.

In the present specification, for ease of description, the dimensions of the various parts shown in the drawings are not drawn to actual scale.

The present application provides a dynamic partition customization method. As shown in FIG. 1, the method mainly includes steps S101 to S104, which are described as follows.

S101 of generating a plurality of original equipment manufacturer (OEM) image files corresponding to requirements of a plurality of different users at compile time.

An Android system is taken as an example. Its super partition is a partition allocated to a device by a user space partition system that can create, destroy, or resize partitions through OTA updates, where sub-partitions can be dynamically resized, a single partition image (image) does not need to reserve space for future OTA, and the remaining free space in the super partition is available for all super partitions. Super image files stored in the super partition include original equipment manufacturer (OEM) image files. The technical solution of the present application is to generate the plurality of OEM image files corresponding to the requirements of the plurality of different users at compilation time, and store the OEM image files in a server. For example, for users U1, U2, and U3, an OEM image-1 corresponding to the requirement of the user U1, the OEM image-2 corresponding to the requirement of the user U2, and the OEM image-3 corresponding to the requirement of the user U3 may be generated at compilation time, and the OEM image-1, the OEM image-2, and the OEM image-3 may be stored in the server.

As an embodiment of the present application, the generating the plurality of original equipment manufacturer (OEM) image files corresponding to the requirements of the plurality of different users at compile time can be implemented by following steps S1011 and S1012.

Step S1011 of reserving a maximum storage space for each of the plurality of OEM image files in the super partition during compilation.

Specifically, the reserving the maximum storage space for each of the plurality of OEM image files in the super partition during compilation may be that the space occupied by other sub-image files in the super partition is subtracted from the space of the super partition, and the remaining of the space of the super partition is allocated to each of the plurality of OEM image files. For example, the size of the space of the super partition is denoted by S-total, and the space occupied by the other sub-image files is denoted by S-others, so that a result of S-total-S-others is a space allocated to each of the plurality of OEM image files.

Step S1012: saving the generated OEM image file to the maximum storage space.

Specifically, the saving the generated OEM image file to the maximum storage space may be implemented by adjusting the storage order of each of the sub-image files in the super partition to store other sub-image files in the front of the super partition (the size of the partition for the other sub-image files is the size of the space denoted by S-others) and save one of the plurality of OEM image files to the last space of the super partition, as shown in FIG. 2, which is a schematic diagram of the storage of n sub-image files and k OEM image files in the server.

S102 of generating a scatter loading file recording OEM image sub-file segments according to a super image file in a super partition.

In the embodiment of the present application, the scatter loading file (i.e., scatterfile) is a mechanism provided by an Acorn RISC Machine (ARM) connector, i.e., a scatter loading mechanism, which divides and places an executable image file (i.e., a Bin file) into different independent segments in the memory, and can assign different storage area addresses to each of the file segments recorded in the scatter loading file during loading and executing the executable image file. As an embodiment of the present application, the generating the scatter loading file according to the super image file in the super partition may be implemented by steps S1021 to S1023, as described below.

Step S1021 of decompressing the super image file in the super partition to obtain a super partition decompression file.

It should be noted that the super image file in the super partition is a file in a sparse format. The super image file in the sparse format cannot be directly processed in a subsequent step and needs to be decompressed. In an embodiment of the present application, the super image file is decompressed with the simg2img procedures to obtain the super partition decompression file in a raw format.

Step S1022 of intercepting a first fixed number of bytes of the super partition decompression file to generate a head file segment.

For example, the head file segment containing all information of the original super image is obtained by intercepting the first 1M bytes of the super partition decompression file.

Step S1023 of generating the scatter loading file according to positions of the other sub-image file segments, the head file segment, and the OEM image sub-file segments divided from the super partition decompression file in an Embedded Multi-Media Card (EMMC).

Figure 3:
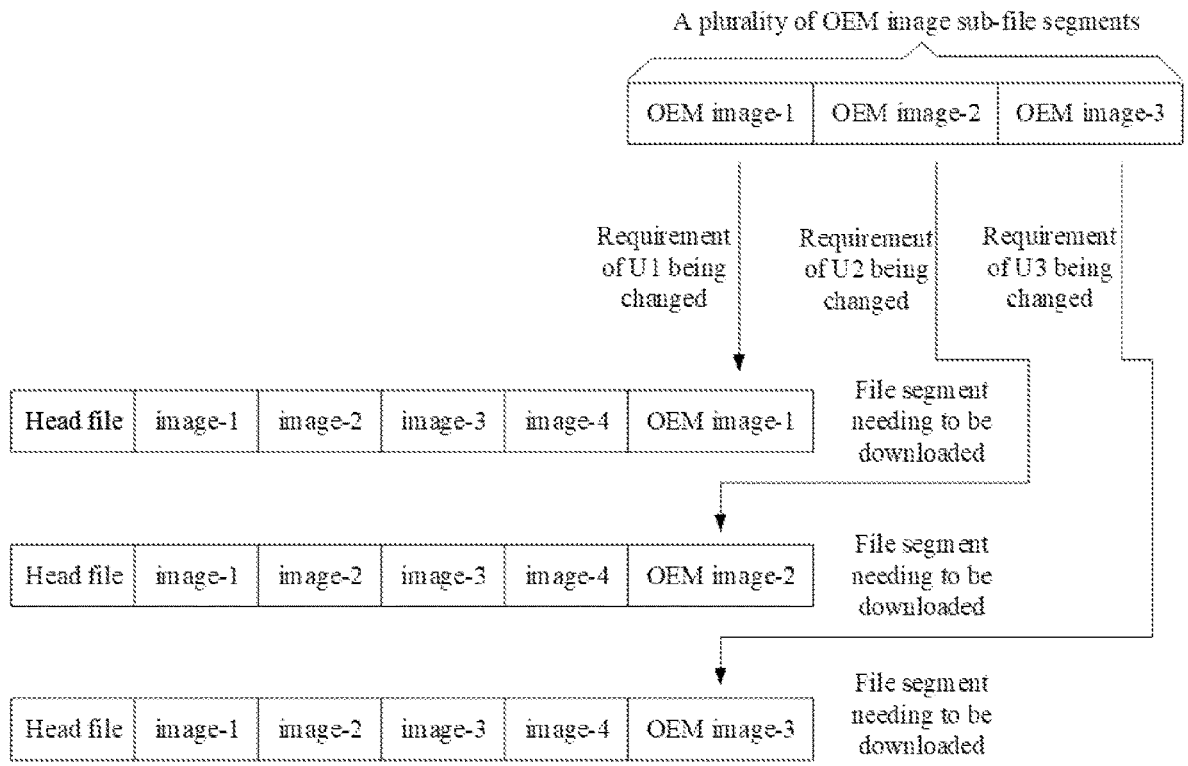
FIG. 3 is a schematic diagram of a decompressed file in a super-partition being partitioned and its sub-file segments being downloaded according to an embodiment of the present application.

Specifically, the scatter loading file may be generated by parsing the super partition decompression file in the raw format with the lpdump procedures to obtain the positions of each of the image files of the super image file in the EMMC and the head file segment, the other sub-image file segments, and the OEM image sub-file segments divided from the super partition decompression file can be recorded in the scatter loading file while generating the scatter loading file. As shown in FIG. 3, the super partition decompression file is divided into four sub-image file segments (image-1, image-2, image-3, and image-4), one header file segment and one OEM image sub-file segment (OEM image-1), or four sub-image file segments (image-1, image-2, image-3, and image-4), one header file segment and one OEM image sub-file segment (OEM image-2), or four sub-image file segments (image-1, image-2, image-3, and image-4), one header file segment, and OEM image sub-file segment (OEM image-3), which are recorded in the scatter loading file.

Step S103: according to change of a requirement of a user among the plurality of different users, downloading an OEM image sub-file segment corresponding to the changed requirement.

In the example of FIG. 2 or FIG. 3, assuming that the requirement of the user U1 is changed, the OEM image sub-file segment corresponding to the requirement of the user U1, i.e., the OEM image-1, is downloaded. Of course, the other four sub-image file segments (image-1, image-2, image-3, and image-4) and the head file segment still need to be downloaded as a common portion for the respective user. Similarly, if the requirement of the user U2 is changed, the OEM image sub-file segment corresponding to the requirement of the user U2, i.e., the OEM image-2, the other four sub-image file segments (image-1, image-2, image-3, and image-4), and the head file segment are downloaded. If the requirement of the user U3 is changed, the OEM image sub-file segment corresponding to the requirement of the user U3, i.e., the OEM image-3, the other four sub-image file segments (image-1, image-2, image-3, and image-4), and the head file segment are downloaded.

Step S104: generating a super partition customization file according to the scatter loading file and the OEM image sub-file segment corresponding to the changed requirement.

For example, for the user U1 mentioned in the foregoing embodiment, a super partition customization file corresponding to the user U1 may be generated by compiling the OEM image-1 corresponding to the changed requirement of the user U1 downloaded via step S103 together with the four sub-image file segments (image-1, image-2, image-3, and image-4) and the head file segment. Similarly, for the user U2 mentioned in the foregoing embodiment, a super partition customization file corresponding to the user U2 may be generated by compiling the OEM image-1 corresponding to the changed requirement of the user U2 downloaded via step S103 together with the four sub-image file segments (image-1, image-2, image-3, and image-4) and the head file segment, and so on.

It can be known from the dynamic partition customization method as illustrated in FIG. 1, since the plurality of OEM image files corresponding to the requirements of the plurality of different users are generated at compile time, when the requirement of a user of the plurality of different users is changed and the OEM image files are downloaded, only the OEM image sub-file segment corresponding to the requirement of the user needs to be downloaded without downloading of the OEM image sub-file segments corresponding to the requirements of other users. Therefore, independent compilation of the OEM images in the dynamic partition is realized, thereby accelerating development and version compilation, and reducing the occupation of server resources.

Figure 4:
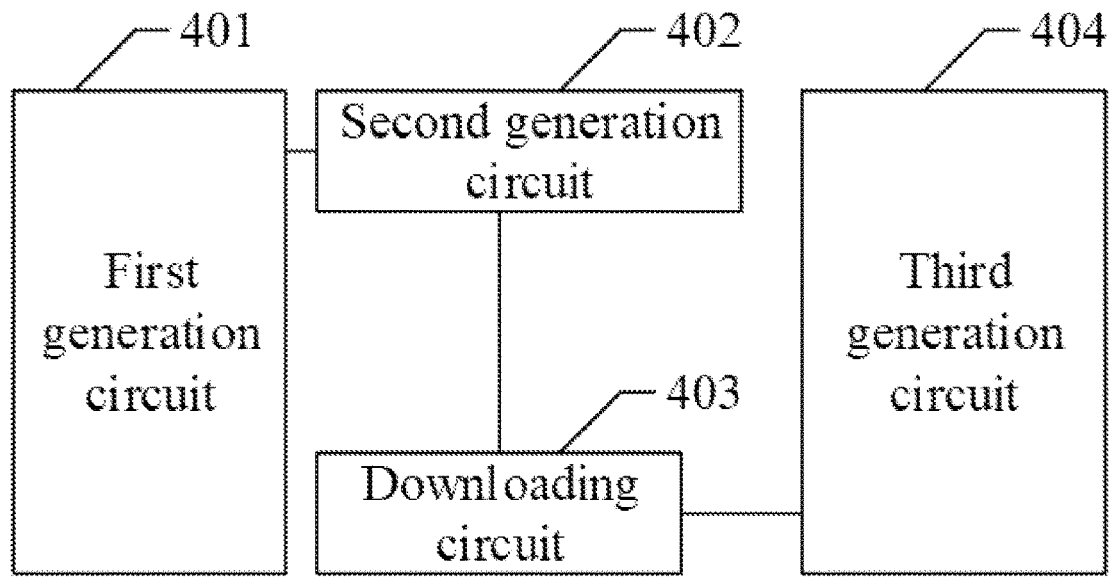
FIG. 4 is a schematic structural diagram of a dynamic partition customization apparatus according to an embodiment of the present application.

Referring to FIG. 4, which shows a dynamic partition customization apparatus provided according to an embodiment of the present application. The apparatus may include a first generation circuit 401, a second generation circuit 402, a download module 403, and a third generation circuit 404, which are described in detail as follows.

The first generation circuit 401 may be configured for generating a plurality of original equipment manufacturer (OEM) image files corresponding to requirements of a plurality of different users at compile time.

The second generation circuit 402 may be configured for generating a scatter loading file recording OEM image sub-file segments according to a super image file in a super partition The downloading circuit 403 may be configured for, change of a requirement of a user among the plurality of different users, downloading an OEM image sub-file segment corresponding to the changed requirement.

The third generation circuit 404 may be configured for generating a super partition customization file based on the scatter loading file and the OEM image sub-file segment corresponding to the changed requirement.

Alternatively, the first generation circuit 401 of FIG. 4 may include a reservation circuit and a saving circuit, where, the reservation circuit is configured for reserving a maximum storage space for each of the plurality of OEM image files in the super partition during compilation; and the saving circuit is configured for saving the generated OEM image file to the maximum storage space.

Alternatively, the reservation circuit is specifically configured for subtracting a space occupied by other sub-image files in the super partition from a space of the super partition and allocating the remaining of the space of the super partition to each of the plurality of OEM image files, and the saving circuit is specifically configured to saving the OEM image files to a last space of the super partition.

Alternatively, the second generation circuit 402 of FIG. 4 may include a decompression circuit, an interception circuit, and a division circuit, where, the decompression circuit is configured for decompressing the super image file in the super partition to obtain a super partition decompression file; the interception circuit is configured for intercepting a first fixed number of bytes of the super partition decompression file to generate a head file segment; and the division circuit is configured for generating the scatter loading file according to positions of the other sub-image file segments, the head file segment, and the OEM image sub-file segments divided from the super partition decompression file in an Embedded Multi-Media Card (EMMC).

It can be seen from the description of the above technical solution, since the plurality of OEM image files corresponding to the requirements of the plurality of different users are generated at compile time, when the requirement of a user of the plurality of different users is changed and the OEM image files are downloaded, only the OEM image sub-file segment corresponding to the requirement of the user needs to be downloaded without downloading of the OEM image sub-file segments corresponding to the requirements of other users. Therefore, independent compilation of the OEM images in the dynamic partition is realized, thereby accelerating development and version compilation, and reducing the occupation of server resources.

Figure 5:
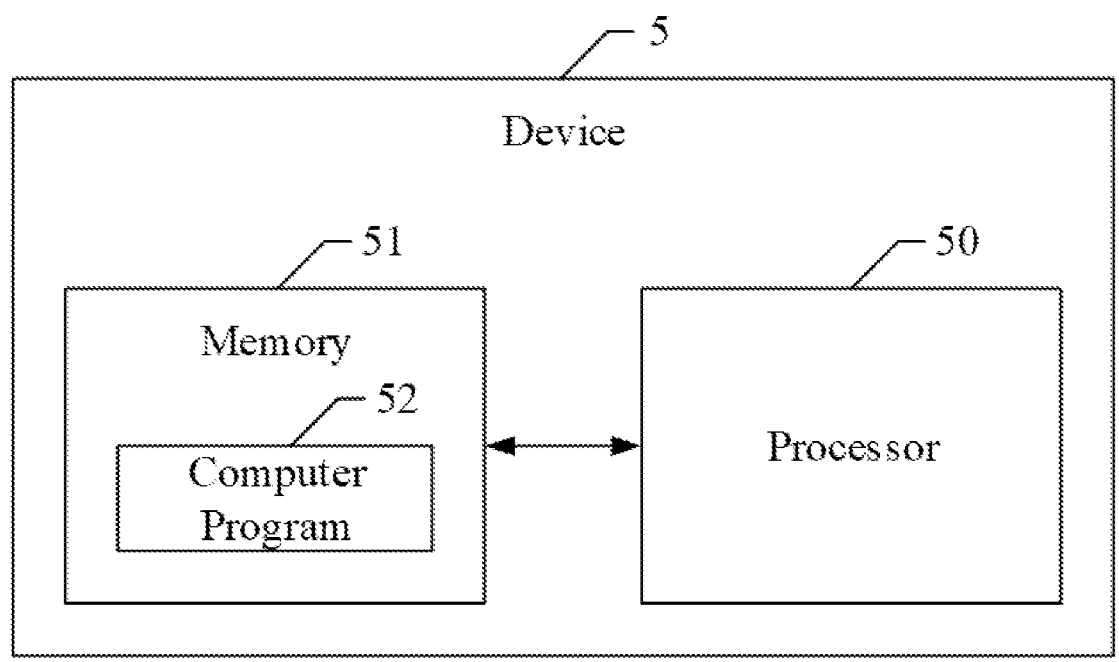
FIG. 5 is a schematic structural diagram of a device according to an embodiment of the present application.

FIG. 5 is a schematic structural diagram of a device according to an embodiment of the present application. As shown in FIG. 5, the device 5 of the embodiment mainly includes a processor 50, a memory 51, and a computer program 52, such as a program for the dynamic partition customization method, stored in the memory 51 and executable on the processor 50. The processor 50 implements the steps of the dynamic partition customization method in the above-described embodiment when executing the computer program 52, such as steps S101 to S104 shown in FIG. 1. Alternatively, the processor 50 implements functions of the modules/units in each of the apparatuses in the above-described embodiments when executing the computer program 52, for example, the functions of the first generation circuit 401, the second generation circuit 402, the downloading circuit 403, and the third generation circuit 404 shown in FIG. 4.

Illustratively, the computer program 52 of the dynamic partition customization method mainly includes generating a plurality of original equipment manufacturer (OEM) image files corresponding to requirements of a plurality of different users at compile time; generating a scatter loading file recording OEM image sub-file segments according to a super image file in a super partition; according to change of a requirement of a user among the plurality of different users, downloading an OEM image sub-file segment corresponding to the changed requirement; and generating a super partition customization file according to the scatter loading file and the OEM image sub-file segment corresponding to the changed requirement. Illustratively, the computer program 52 may be divided into one or more modules/units that are stored in memory 51 and executed by processor 50 to implement the present application. The one or more modules/units may be a series of computer program instruction segments capable of performing a particular function for describing the execution of a computer program 52 in a device 5. For example, the computer program 52 may be divided into functions of the first generation circuit 401, the second generation circuit 402, the downloading circuit 403, and the third generation circuit 404 (a module in a virtual apparatus). The first generation circuit 401 is configured for generating a plurality of original equipment manufacturer (OEM) image files corresponding to requirements of a plurality of different users at compile time. The second generation circuit 402 is configured for generating a scatter loading file recording OEM image sub-file segments according to a super image file in a super partition. The downloading circuit 403 is configured for, according to change of a requirement of a user among the plurality of different users, downloading an OEM image sub-file segment corresponding to the changed requirement. The third generation circuit 404 is configured for generating a super partition customization file based on the scatter loading file and the OEM image sub-file segment corresponding to the changed requirement.

The device 5 may include, but not limited to, a processor 50 and a memory 51. It should be understood by those skilled in the art that FIG. 5 shows merely an example of the device 5 and should be not constituted to be a limitation on the device 5, and may include more or less components than illustrated, or may combine certain components, or different components. For example, a computing device may also include an input/output device, a network access device, a bus, etc.

The processor 50 may be a Central Processing Unit (CPU) or other general purpose processor, a Digital Signal Processor (DSP), an Application Specific Integrated Circuit (ASIC), a Field-Programmable Gate Array (FPGA) or other programmable logic device, a discrete gate or transistor logic device, a discrete hardware component, etc. The general purpose processor may be a microprocessor or the processor may be any conventional processor or the like.

The memory 51 may be an internal storage unit of the device 5, such as a hard disk or a memory of the device 5. The memory 51 may also be an external storage device of the device 5, such as a plug-in hard disk, a Smart Media Card (SMC), a Secure Digital (SD) card, a Flash Card, or the like provided on the device 5. Further, the memory 51 may also include an internal storage unit of the device 5 as well as an external storage device. The memory 51 is used to store computer programs and other programs and data required by the device. The memory 51 may also be used to temporarily store data that has been output or is to be output.

It should be apparent to those skilled in the art that, for convenience and brevity of description, only the division of the above-mentioned functional units and modules will be exemplified. In practical application, the above-mentioned functional allocation may be accomplished by different functional units and modules, i.e., the internal structure of the device is divided into different functional units or modules, so as to perform all or part of the functions described above. The various functional units/modules in each of the embodiments may be integrated into a single processing unit, or exist individually and physically, or two or more than two units are integrated into a single unit. The aforesaid integrated unit may either be achieved by hardware, or be achieved in the form of software functional units. In addition, the specific names of the functional units/modules are intended to be distinguishable from each other only, and are not intended to limit the scope of protection of the present application. For a specific operation process of the units/modules in the above-mentioned apparatus, reference may be made to the corresponding process in the above-mentioned method embodiment, which are not repeatedly described herein.

In the aforesaid embodiments, the descriptions of each of the embodiments are emphasized respectively, regarding the part of one embodiment which isn't described or disclosed in detail, reference may be made to relevant descriptions in some other embodiments.

The person of ordinary skill in the art may be aware of that, the elements and algorithm steps of each of the examples described in connection with the embodiments disclosed herein may be implemented in electronic hardware, or in combination with computer software and electronic hardware. Whether these functions are implemented by hardware or software depends on the specific application and design constraints of the technical solution. The skilled people could use different methods to implement the described functions for each particular application, however, such implementations should not be considered as going beyond the scope of the present application.

It should be understood that, in the embodiments of the present application, the disclosed apparatus/device and method could be implemented in other ways. For example, the apparatus/device described above are merely illustrative; for example, the division of the units is only a logical function division, and other division could be used in the actual implementation, for example, multiple units or components could be combined or integrated into another apparatus, or some features may be ignored or not performed. In another aspect, the coupling or direct coupling or communicating connection shown or discussed could be an indirect coupling or a communicating connection through some interfaces, apparatus or units, and the coupling or direct coupling or communicating connection could be electrical, mechanical, or in other form.

The units described as separate components could or could not be physically separate, the components shown as units could or could not be physical units, which may be located in one place, or may be distributed to multiple network elements. A part or a whole of the elements could be selected according to the actual needs to achieve the objective of the present embodiment.

In addition, the various functional units in each of the embodiments of the present application may be integrated into a single processing unit, or exist individually and physically, or two or more than two units are integrated into a single unit. The integrated unit may be implemented in the form of a hardware or in the form of software functional units.

If the integrated unit is achieved in the form of software functional units, and is sold or used as an independent product, it may be stored in a non-transitory computer readable storage medium. Based on this understanding, a whole or part of flow process of implementing the method in the aforesaid embodiments of the present application may also be accomplished by using computer program to instruct relevant hardware. The computer program of the dynamic partition customization method can be stored in a computer readable storage medium, and can, when executed by the processor, implement the steps of the method in any of the above-mentioned embodiments, i.e., generating a plurality of original equipment manufacturer (OEM) image files corresponding to requirements of a plurality of different users at compile time; generating a scatter loading file recording OEM image sub-file segments according to a super image file in a super partition; according to change of a requirement of a user among the plurality of different users, downloading an OEM image sub-file segment corresponding to the changed requirement; and generating a super partition customization file according to the scatter loading file and the OEM image sub-file segment corresponding to the changed requirement. Where, the computer program includes computer program codes which may be in the form of source code, object code, executable files or some intermediate form, etc. The non-transitory computer readable medium may include: any entity or apparatus that may carry the computer program codes, recording medium, USB flash disk, mobile hard disk, hard disk, optical disk, computer storage device, Read-Only Memory (ROM), Random Access Memory (RAM), electrical carrier signal, telecommunication signal and software distribution medium, etc. It needs to be explained that, the contents contained in the non-transitory computer readable medium may be added or reduced appropriately according to the requirement of legislation and patent practice in a judicial district, for example, in some judicial districts, according to legislation and patent practice, the non-transitory computer readable medium doesn't include electrical carrier signal and telecommunication signal. The aforesaid embodiments are only intended to explain but not to limit the technical solutions of the present application. Although the present application has been explained in detail with reference to the above-described embodiments, the person of ordinary skill in the art may understand that, the technical solutions described in each of the embodiments mentioned above may still be amended, or some technical features in the technical solutions may be replaced equivalently; these amendments or equivalent replacements, which doesn't cause the essence of the corresponding technical solution to be broken away from the spirit and the scope of the technical solution in various embodiments of the present application, should all be included in the protection scope of the present application.

The objects, technical solutions, and advantages of the present invention have been described in further detail in the detailed description. It should be understood that the foregoing description is only specific embodiments of the present application, and is not intended to limit the scope of the present application, and that any modifications, equivalents, modifications and the like, which fall within the spirit and principles of the present application, are intended to be included within the scope of the present application.

What is claimed is:

1. A dynamic partition customization method, comprising:
generating a plurality of original equipment manufacturer (OEM) image files corresponding to requirements of a plurality of different users at compile time;
generating a scatter loading file recording OEM image sub-file segments according to a super image file in a super partition;
based on change of a requirement of a user among the plurality of different users, downloading an OEM image sub-file segment corresponding to the changed requirement; and
generating a super partition customization file based on the scatter loading file and the OEM image sub-file segment corresponding to the changed requirement.

2. The method of claim 1, wherein the generating of the plurality of original equipment manufacturer (OEM) image files comprises:
reserving a maximum storage space for each of the plurality of OEM image files in the super partition during compilation; and
saving the generated OEM image file to the maximum storage space.

3. The method of claim 2, wherein the reserving of the maximum storage space comprises subtracting a space occupied by other sub-image files in the super partition from a space of the super partition and allocating the remaining of the space of the super partition to each of the plurality of OEM image files; and
the saving of the generated OEM image file to the maximum storage space comprises: saving the OEM image files to a last space of the super partition.

4. The method of claim 3, wherein the saving of the generated OEM image file to the maximum storage space further comprises: adjusting a storage order of each of the sub-image files in the super partition to store the other sub-image files in the front of the super partition.

5. The method of claim 1, wherein the generating of the scatter loading file comprises:
decompressing the super image file in the super partition to obtain a super partition decompression file;
intercepting a first fixed number of bytes of the super partition decompression file to generate a head file segment; and
generating the scatter loading file according to positions of the other sub-image file segments, the head file segment, and the OEM image sub-file segments divided from the super partition decompression file in an Embedded Multi-Media Card (EMMC).

6. The method of claim 5, wherein the decompressing of the super image file in the super partition comprises: decompressing the super image file with simg2img procedures to obtain the super partition decompression file in a raw format.

7. The method of claim 6, wherein the generating of the scatter loading file comprises:
generating the scatter loading file by parsing the super partition decompression file in the raw format with lpdump procedures to obtain the positions of each of the image files of the super image file in the EMMC, and recording the head file segment, the other sub-image file segments, and the OEM image sub-file segments divided from the super partition decompression file in the scatter loading file while generating the scatter loading file.

8. A dynamic partition customization apparatus, comprising:
a first generation circuit for generating a plurality of original equipment manufacturer (OEM) image files corresponding to requirements of a plurality of different users at compile time;
a second generation circuit for generating a scatter loading file recording OEM image sub-file segments according to a super image file in a super partition;
a downloading circuit for, based on change of a requirement of a user among the plurality of different users, downloading an OEM image sub-file segment corresponding to the changed requirement; and
a third generation circuit for generating a super partition customization file based on the scatter loading file and the OEM image sub-file segment corresponding to the changed requirement.

9. The apparatus of claim 8, wherein the first generation circuit comprises:
a reservation circuit for reserving a maximum storage space for each of the plurality of OEM image files in the super partition during compilation; and
a saving circuit for saving the generated OEM image file to the maximum storage space.

10. The apparatus of claim 9, wherein the reservation circuit is specifically configured for subtracting a space occupied by other sub-image files in the super partition from a space of the super partition and allocating the remaining of the space of the super partition to each of the plurality of OEM image files; and the saving circuit is specifically configured for saving the OEM image files to a last space of the super partition.

11. The apparatus of claim 10, wherein the saving circuit is further configured for adjusting a storage order of each of the sub-image files in the super partition to store the other sub-image files in the front of the super partition.

12. The apparatus of claim 8, wherein the second generation circuit comprises:

a decompression circuit for decompressing the super image file in the super partition to obtain a super partition decompression file;

an interception circuit for intercepting a first fixed number of bytes of the super partition decompression file to generate a head file segment; and a division circuit for generating the scatter loading file according to positions of the other sub-image file segments, the head file segment, and the OEM image sub-file segments divided from the super partition decompression file in an Embedded Multi-Media Card (EMMC).

13. The apparatus of claim 12, wherein the decompression circuit is specifically configured for decompressing the super image file with simg2img procedures to obtain the super partition decompression file in a raw format.

14. The apparatus of claim 13, wherein, the division circuit is specifically for generating the scatter loading file by parsing the super partition decompression file in the raw format with lpdump procedures to obtain the positions of each of the image files of the super image file in the EMMC, and recording the head file segment, the other sub-image file segments, and the OEM image sub-file segments divided from the super partition decompression file in the scatter loading file while generating the scatter loading file.

15. A device, comprising: a memory, a processor, and a computer program stored on the memory and operable on the processor, wherein the computer program, when executed by the processor, implements operations comprising:

generating a plurality of original equipment manufacturer (OEM) image files corresponding to requirements of a plurality of different users at compile time;

generating a scatter loading file recording OEM image sub-file segments according to a super image file in a super partition;

based on change of a requirement of a user among the plurality of different users, downloading an OEM image sub-file segment corresponding to the changed requirement; and generating a super partition customization file based on the scatter loading file and the OEM image sub-file segment corresponding to the changed requirement.

16. The device of claim 15, wherein the generating of the plurality of original equipment manufacturer (OEM) image files comprises:

reserving a maximum storage space for each of the plurality of OEM image files in the super partition during compilation; and saving the generated OEM image file to the maximum storage space.

17. The device of claim 16, wherein the reserving of the maximum storage space comprises subtracting a space occupied by other sub-image files in the super partition from a space of the super partition and allocating the remaining of the space of the super partition to each of the plurality of OEM image files; and the saving of the generated OEM image file to the maximum storage space comprises: saving the OEM image files to a last space of the super partition.

18. The device of claim 17, wherein the saving of the generated OEM image file to the maximum storage space further comprises: adjusting a storage order of each of the sub-image files in the super partition to store the other sub-image files in the front of the super partition.

19. The device of claim 15, wherein the generating of the scatter loading file comprises:

decompressing the super image file in the super partition to obtain a super partition decompression file;

intercepting a first fixed number of bytes of the super partition decompression file to generate a head file segment; and generating the scatter loading file according to positions of the other sub-image file segments, the head file segment, and the OEM image sub-file segments divided from the super partition decompression file in an Embedded Multi-Media Card (EMMC).

20. The device of claim 19, wherein the decompressing of the super image file in the super partition comprises: decompressing the super image file with simg2img procedures to obtain the super partition decompression file in a raw format.

* * * * *